United States Patent
Deng et al.

(10) Patent No.: US 11,063,540 B2
(45) Date of Patent: Jul. 13, 2021

(54) CONTROLLING A WIND TURBINE GENERATOR

(71) Applicant: Siemens Gamesa Renewable Energy A/S, Brande (DK)

(72) Inventors: Heng Deng, Ikast (DK); Per Egedal, Herning (DK); Ge Xie, Frederiksberg (DK)

(73) Assignee: SIEMENS GAMESA RENEWABLE ENERGY A/S

(*) Notice: Subject to any disclaimer, the term of this patent is extended or adjusted under 35 U.S.C. 154(b) by 0 days.

(21) Appl. No.: 16/486,923

(22) PCT Filed: Jan. 23, 2018

(86) PCT No.: PCT/EP2018/051530
§ 371 (c)(1),
(2) Date: Aug. 19, 2019

(87) PCT Pub. No.: WO2018/153591
PCT Pub. Date: Aug. 30, 2018

(65) Prior Publication Data
US 2020/0059181 A1 Feb. 20, 2020

(30) Foreign Application Priority Data
Feb. 21, 2017 (DE) ...................... 10 2017 202 794.0

(51) Int. Cl.
*F03D 9/00* (2016.01)
*H02P 9/04* (2006.01)
*H02P 21/05* (2006.01)
*H02P 21/22* (2016.01)
*F03D 9/25* (2016.01)
*H02P 101/15* (2016.01)

(52) U.S. Cl.
CPC ................ *H02P 21/05* (2013.01); *F03D 9/25* (2016.05); *H02P 21/22* (2016.02); *H02P 2101/15* (2015.01)

(58) Field of Classification Search
CPC ............. H02P 21/05; H02P 21/22; F03D 9/25
See application file for complete search history.

(56) References Cited

FOREIGN PATENT DOCUMENTS

| EP | 2552013 A1 | 1/2013 |
|---|---|---|
| EP | 3076542 A1 | 10/2018 |

OTHER PUBLICATIONS

Sang-Moon Hwang et al: "Various Design Techniques to Reduce Cogging Torque by Controlling Energy Variation in Permanent Magnet Motors", IEEE Transactions on Magnetics, IEEE Service Center, New York, NY, US, 2001 vol. 37, No. 4, XP011033509, ISSN: 0018-9464.

(Continued)

*Primary Examiner* — Tulsidas C Patel
*Assistant Examiner* — Thomas K Quigley
(74) *Attorney, Agent, or Firm* — Schmeiser, Olsen & Watts LLP

(57) ABSTRACT

Provided is a method of controlling a permanent magnet generator, the method including: measuring mechanical noise of the generator; deriving two quantities indicative of an amplitude and a phase of an undesired harmonic of the measured noise; deriving, based on the quantities, a current to be injected in stator coils of the generator such as to reduce the undesired harmonic.

11 Claims, 9 Drawing Sheets

(56) References Cited

OTHER PUBLICATIONS

Tinghsu Su et al: "Suppression Control Method for Torque Vibration of AC Motor Utilizing Repetitive Controller With Fourier Transform"; IEEE Transactions on Industry Applications; IEEE Service Center; Piscataway; NJ; US; vol. 38; No. 5; XP011073547; ISSN: 0093-9994.
International Search Report & Written Opinion dated Apr. 23, 2018 for Application No. PCT/EP2018/051530.

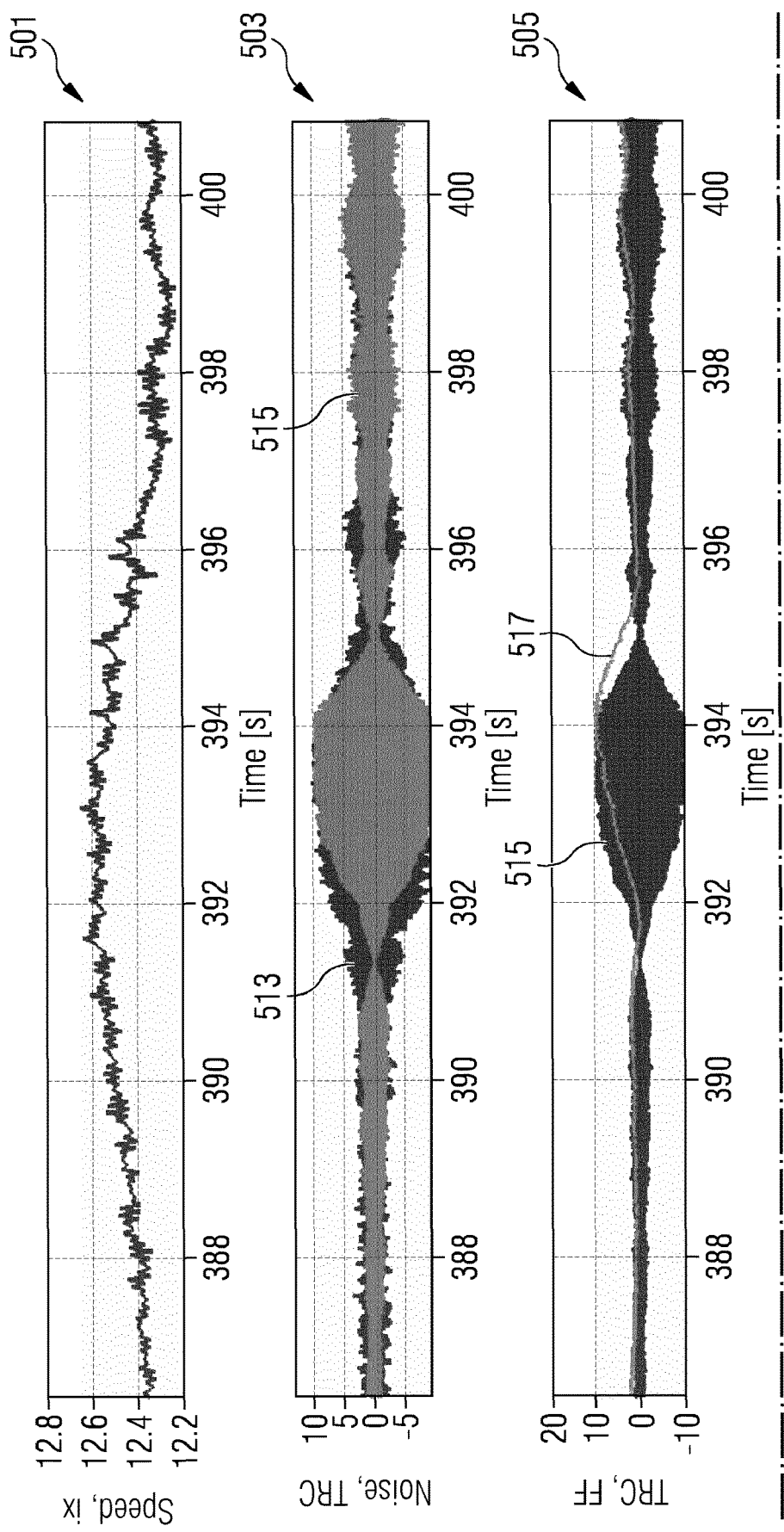

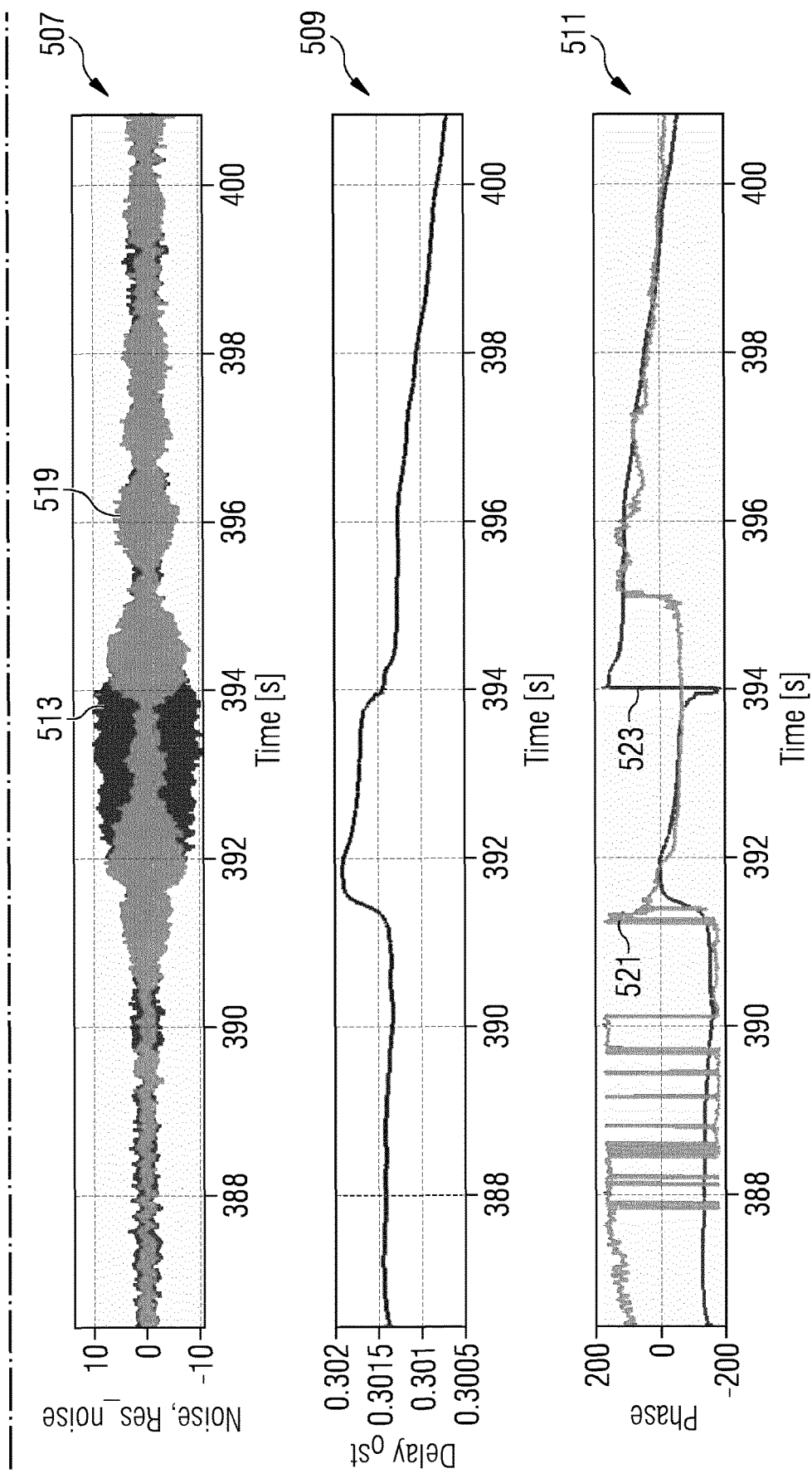

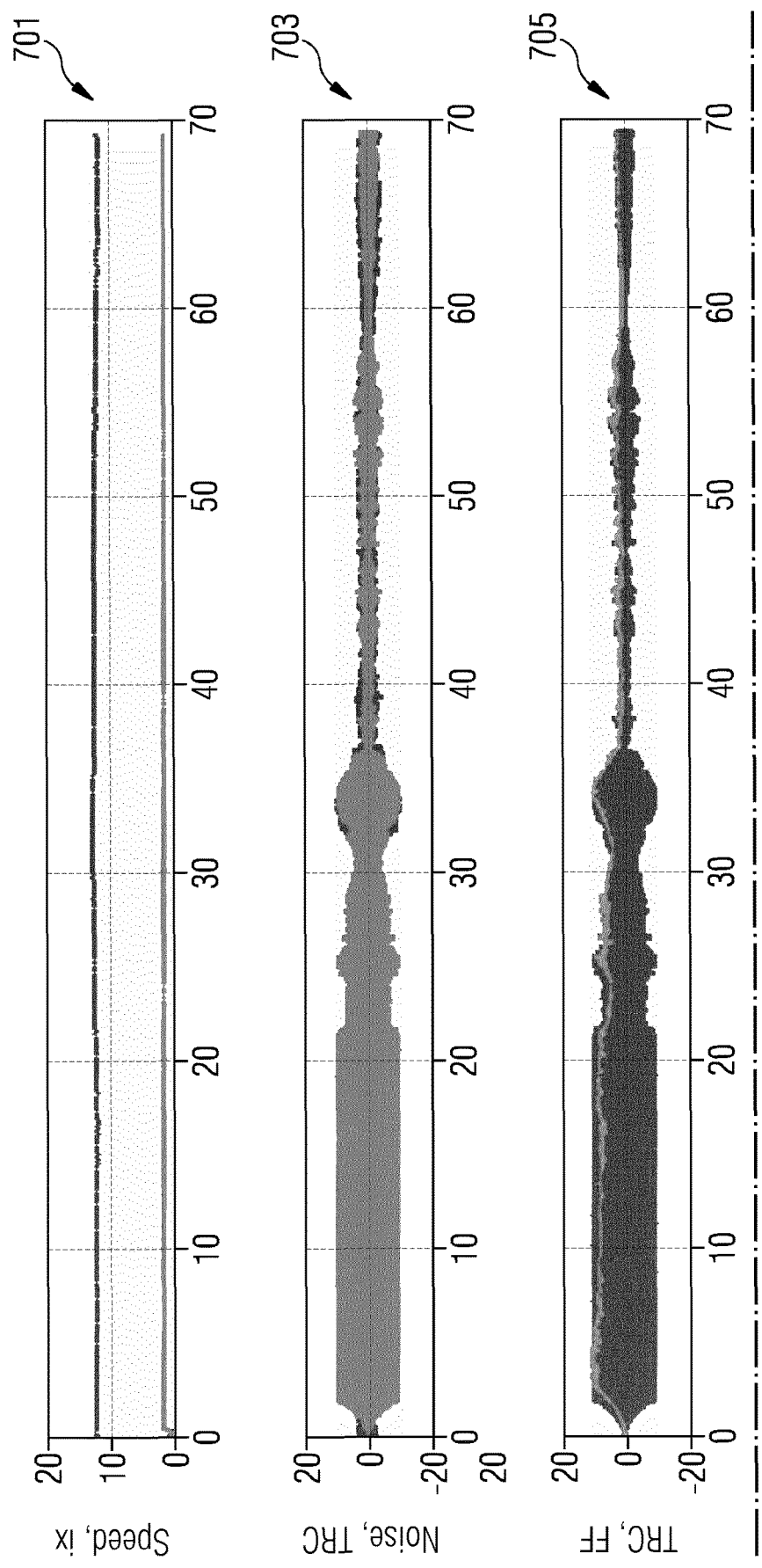

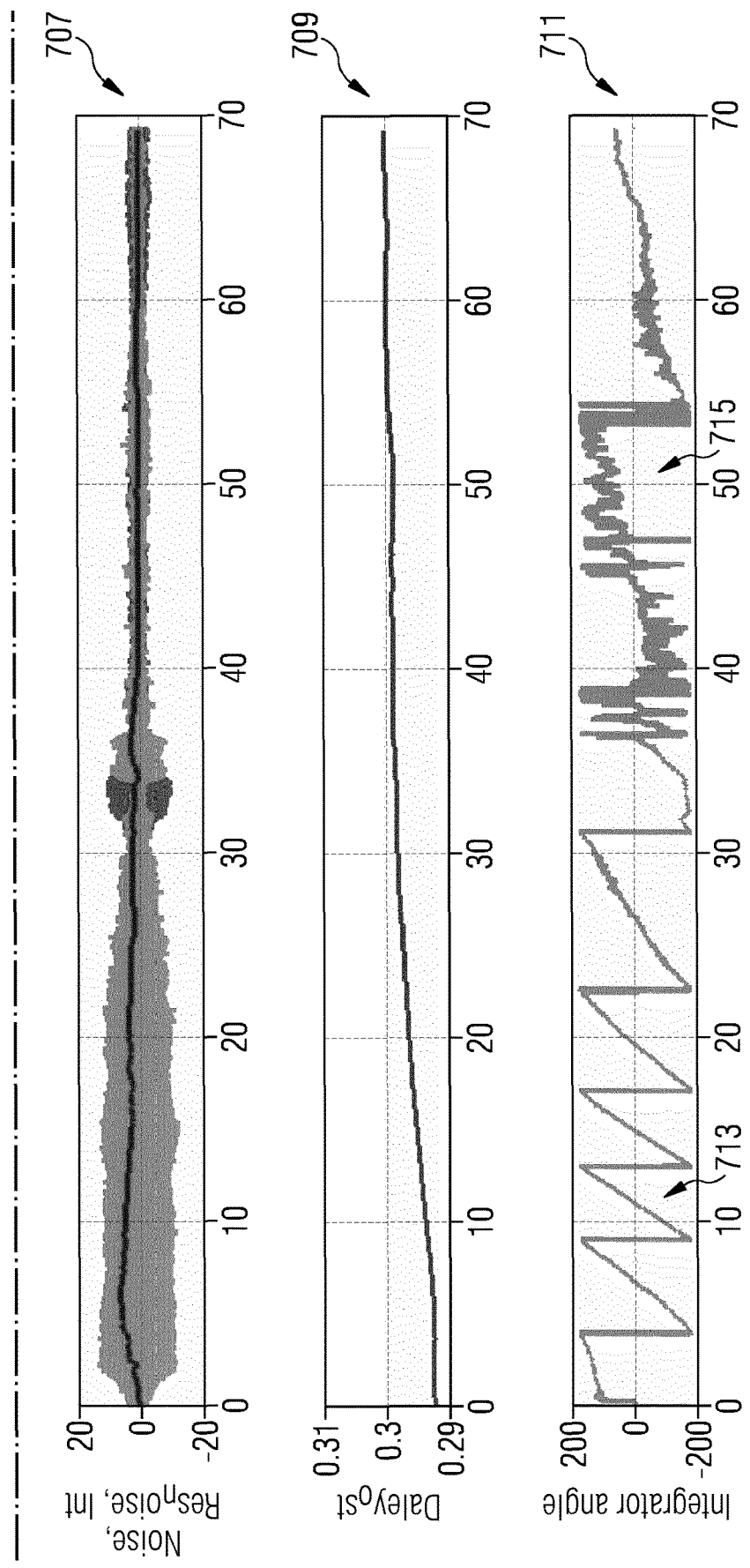

CONTROLLING A WIND TURBINE GENERATOR

CROSS-REFERENCE TO RELATED APPLICATIONS

This application claims priority to PCT Application No. PCT/EP2018/051530, having a filing date of Jan. 23, 2018, which is based on German Application No. 10 2017 202 794.0, having a filing date of Feb. 21, 2017, the entire contents both of which are hereby incorporated by reference.

FIELD OF TECHNOLOGY

The following relates to a method and arrangement for controlling a permanent magnet generator, in particular of a wind turbine. The following further relates to an arrangement for controlling a permanent magnet generator, relates to a generator and further relates to a wind turbine.

BACKGROUND

A permanent magnet generator comprises a stator having one or more sets of stator windings relative to which a rotor comprising plural permanent magnets is rotatably supported. Upon rotation of the rotor, electric currents are induced in the generator windings. One drawback of permanent magnet generators is the torque ripple which is a consequence of the variance of the magnetic field between the poles of the generators. This ripple may result in vibration and noise.

A conventional technique to reduce the torque ripple may involve skewing the magnets. Another method which is conventionally used may be to reduce the ripple by an added electrical current which may produce a counter-torque to reduce the ripple.

EP 2 485 388 A1 discloses a reduction of noise and vibration of an electromechanical transducer by using a modified stator coil drive signal comprising harmonic components, wherein a harmonic control signal being indicative of a harmonic operational behaviour of the electromechanical transducer is determined and a modified drive signal is generated based thereon which is then supplied to electromagnetic coils of the stator of the electromechanical transducer. Thereby, as a function of power and speed, a look-up table stores current values to be injected with the right phase and amplitude. The tuning of this look-up table is a relatively resource consuming task and may require changes of hardware or the core controller may require new tuning.

It has been observed that the conventional methods and arrangements do not in all situations reduce the undesired torque ripple and thereby the generated vibration and noise in a reliable manner to an acceptable degree.

Thus, there may be a need for a method and an arrangement for controlling a permanent magnet generator, wherein undesired torque ripples are effectively reduced and wherein in particular undesired harmonic noise is reduced.

SUMMARY

An aspect relates to a method of controlling a permanent magnet generator, the method comprising: measuring mechanical noise of the generator; deriving two quantities indicative of an amplitude and a phase of an undesired harmonic of the measured noise; deriving, based on the quantities, a current to be injected in stator coils of the generator such as to reduce the undesired harmonic.

The method may be implemented in software and/or hardware and may be performed by for example a wind turbine controller or a wind park controller. The mechanical noise may be measured by a sensor, in particular a microphone, not necessarily arranged very close to the generator. Alternatively, the mechanical noise may be detected by using a strain gauge. The mechanical noise may thereby be measured by detecting plural samples of pressure over time. Thus, a time course of the mechanical noise may be measured and used in the control method.

Embodiments of the present invention may be applied to reduce one or more harmonics of a fundamental (electrical) frequency representing the base frequency with which the generator operates which may be proportional to the rotational speed (revolutions per second) of the rotor multiplied by the number of magnet poles. In particular, the fundamental electric frequency may be a multiplicity of the rotational frequency of the rotation shaft to which the rotor of the generator is connected. Embodiments of the present invention enable for example to reduce a 2f harmonic, a 4f harmonic, a 6f harmonic or the like, wherein f stands for the fundamental electric frequency or may stand for the fundamental mechanical frequency. Thus, the undesired harmonic may for example be defined as 2f, 4f, 6f or even higher harmonics.

Deriving the two quantities may involve performing a transformation of the time course of the mechanical noise, as measured. The mechanical noise may for example be transformed into a frequency domain or into a coordinate frame rotating with the frequency corresponding to the undesired harmonic, thereby in particular involving transformation into a dq-coordinate system rotating with the frequency corresponding to the undesired harmonic (of the fundamental frequency).

The current to be injected may be derived such as, when actually injected into stator coils of the generator, to reduce the amplitude of the undesired harmonic of the measured noise. The current may for example be injected using a converter, in particular an AC-DC-AC converter which may be connected to output terminals of the generator. The converter may comprise plural controllable switches, such as IGBTs, which are controlled by appropriate gate driver signals, such that a defined voltage, current and so on is achieved in the stator coils of the generator.

When deriving the current to be injected in the stator coils, a delay time of the noise generated at the generator and measured using the noise sensor, in particular a microphone, may be taken into account. Thus, the undesired harmonic of the noise generated by the generator may reliably and effectively be reduced, in particular even avoided.

According to embodiments of the present invention, the mechanical noise of the generator is measured using a microphone arranged a distance away from the generator, wherein deriving the quantities comprises: determining a delay time of a propagation of the noise over the distance from the generator to the microphone; delaying an electrical phase of the undesired harmonic with the delay time; performing a dq-transformation of the measured noise, the dq-transformation being defined by a frequency and the delayed electrical phase of the undesired harmonic, to obtain a d-component and a q-component of the undesired harmonic of the noise as the quantities.

The distance may for example be between 1 m and 150 m, in particular between 1 m and 10 m, or the height of a wind turbine tower. The noise generated at the generator may travel with the speed of sound away from the noise source and is only at a later time received and detected by the microphone. The delay time may thus be considered to be the time which is required by the pressure change to propagate from the generator to the microphone. The delay time may continuously be determined by the control method. It may not be required to determine the delay time by determining the distance between the generator and the microphone.

The electrical phase of the undesired harmonic measured by the microphone is delayed with the delay time, to associate the present noise signal measured by the microphone with an event at the generator occurring in the past. The dq-transformation with which the measured noise is transformed is defined by the frequency and the delayed electrical phase of the undesired harmonic. Thus, the coordinate system associated with the dq-transformation rotates with a frequency of the undesired harmonic. The dq-transformation may be performed in a conventional manner as soon as the frequency and the delayed electrical phase are available.

According to embodiments of the present invention, deriving the current comprises: supplying the d-component and the q-component of the undesired harmonic of the noise as inputs to a controller, in particular PI controller; outputting a d-component and a q-component of the current to be injected from the controller.

The controller will, depending on the input, provide an output which, when supplied to the stator coils of the generator, will cause the generator to operate, such that the d-component and the q-component of the undesired harmonic are reduced.

According to embodiments of the present invention, deriving the current further comprises: supplying (e.g. in a feed forward manner) a d-component and a q-component of a current estimate associated with an actual (undelayed) working point of the generator as further input to the controller; adding, for each the d-component and q-component, the current estimate, a term proportional to the undesired harmonic of the noise and a term proportional to a time integral value of the undesired harmonic of the noise, to obtain a sum; outputting, for each the d-component and q-component, the current to be injected based on the sum.

The current estimate (also referred to as feed forward value) may be taken from an electronic storage, in particular a look-up table which associates current estimate with different working points. The working point may for example be defined by specifying the rotational speed of the generator and the electrical power of the generator or by only specifying the rotational speed of the generator or by specifying alternatively or additionally other operational properties of the generator. When the current estimate from the storage is taken into account, the control may be even faster. Further, the current estimate in the storage may be updated during the method as is explained below in more detail. The controller may further comprise additionally a differential term of the undesired harmonic of the noise according to embodiments of the present invention.

The time integral value may also be considered to represent a summation value obtained by summing plural samples.

According to embodiments of the present invention, the current to be injected is derived by: transforming the d-component and q-component of the sum into a polar representation including amplitude and phase of the sum, restricting the magnitude of the amplitude, and back-transforming the restricted amplitude and the phase of the sum, to obtain a restricted sum as a d-component and a q-component of the current to be injected.

The restricting the magnitude of the amplitude may involve replacing the amplitude with one having a magnitude smaller or equal to a threshold. Thereby, the current to be injected may be limited in its magnitude, in order to avoid or reduce damaging of components of the generator.

According to embodiments of the present invention, the controller may apply reset windup feedback, comprising determining a difference between the sum and the restricted sum; multiplying the difference with a factor; deriving the time integral value taking into account the multiplied difference. Thereby, runaway may be prevented. Further, the controller may thereby be improved regarding stability.

According to embodiments of the present invention, the determining the delay time comprises deriving a polar angle of d-component and q-component of the time integral value; determining an angle difference between subsequent samples of the polar angle; integrating an angle difference based quantity, if an amplitude of the d-component and q-component of the time integral value is greater than a threshold, to obtain the delay time.

The determining the delay time may be accomplished by using a particular delay tuner module. Determining the angle difference may also be considered as determining a derivative of the angle. A modulo operation may be applied to the angle difference, further a gain may be applied to the output of the modulo operation. Further, a saturation may be performed and the output of the saturation may be input in an integrator which integrates the input subjected to the condition that an enable signal is given, wherein the enable signal indicates that the absolute of the amplitude of the time integral value is greater than a threshold. Thereby, the delay time may be effectively and reliably obtained and used in the control method.

According to embodiments of the present invention, the method further comprises storing the d-component and the q-component of a current estimate associated with previous encountered working points in a storage; updating the d-component and the q-component of the current estimate associated with the delayed working point based on the controller output of the current to be injected, derived based on the delayed undesired harmonic of noise.

The current estimate may also be considered as a feed-forward value. The feedforward value supplied to the controller is the one which is associated with the current working point. However, the feedforward value which is updated in the storage is the one which is associated to the delayed working point.

According to embodiments of the present invention, the method further comprises performing a (undelayed) reverse dq-transformation of the d-component and a q-component of the current to be injected; and injecting the reverse transformed current in at least one stator coil of the generator.

Injecting the reversed transformed current may involve deriving appropriate gate driver signals of the control switches of the converter which is connected to output terminals of the generator.

It should be understood that features individually or in any combination disclosed for a method of controlling a permanent magnet generator may also be applied to an arrangement for controlling a permanent magnet generator according to embodiments of the present invention and vice versa.

According to embodiments of the present invention it is provided an arrangement for controlling a permanent magnet generator, the arrangement comprising: a microphone adapted to measure mechanical noise of the generator; a processor adapted to derive two quantities indicative of an amplitude and a phase of an undesired harmonic of the measured noise; and to derive, based on the quantities, a current to be injected in stator coils of the generator such as to reduce the undesired harmonic.

According to embodiments of the present invention. it is provided a generator which comprises an arrangement according to the embodiment disclosed or described above.

Further, a wind turbine comprising the generator is provided.

BRIEF DESCRIPTION

Some of the embodiments will be described in detail, with references to the following Figures, wherein like designations denote like members, wherein:

FIG. 1 schematically illustrates a wind turbine according to embodiments of the present invention;

FIG. 2 schematically illustrates a simulation model including an arrangement for controlling a permanent magnet generator according to embodiments of the present invention which may for example be comprised in the wind turbine illustrated in FIG. 1;

FIG. 3 schematically illustrates a PI controller which may be included in arrangements according to embodiments of the present invention;

FIG. 4 schematically illustrates a delay tuner which may be comprised in arrangements according to embodiments of the present invention;

FIG. 5A illustrates graphs showing the performance of methods according to embodiments of the present invention;

FIG. 5B illustrates graphs showing the performance of methods according to embodiments of the present invention

FIG. 7A illustrates graphs for showing performances of methods according to embodiments of the present invention; and FIG. 7B illustrates graphs for showing performances of methods according to embodiments of the present invention.

DETAILED DESCRIPTION

Figure 1:
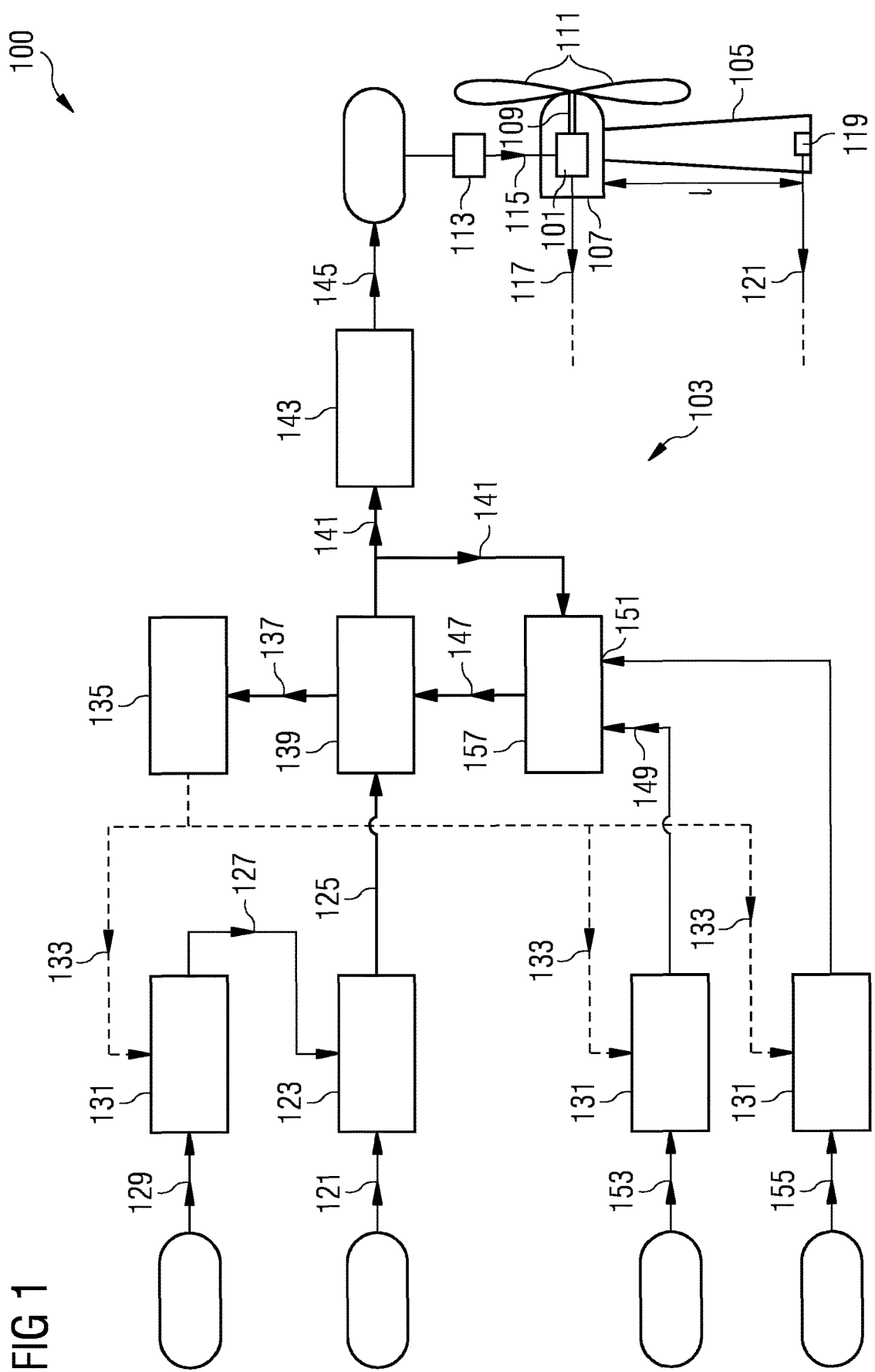

The illustration in the drawings is in schematic form. It is noted that in different FIGS. 1 to 4, similar or identical elements are provided with the same reference signs or with reference signs, which are different from the corresponding reference signs only within the first digit.

The wind turbine 100 schematically illustrated in FIG. 1 comprises a generator 101 including an arrangement 103 for controlling the permanent magnet generator 101 according to embodiments of the present invention, wherein the arrangement 103 is configured to carry out a method of controlling the permanent magnet generator 101 according to embodiments of the present invention.

The wind turbine 100 includes a wind turbine tower 105 on top of which a nacelle 107 is mounted in which the generator 101 is arranged. The generator comprises a rotor with permanent magnets which is connected to a wind turbine shaft 109 to which plural rotor blades 111 are connected. The wind turbine 100 further comprises a wind turbine controller 113 which controls the operation of the wind turbine, in particular by supplying a current 115 to stator coils of the generator 101. Upon rotation of the rotor blades 111, the generator 101 generates electric energy which is output as an energy or power stream 117.

The wind turbine 100 further comprises a microphone 119 at the base of the tower 105 which detects noise generated by the generator 101 and outputs a corresponding measurement signal 121 which is used in embodiments of the present invention.

Therein, the arrangement 103 receives the signal 121 from the microphone 119, wherein the signal 121 represents a time course of the sound pressure as received by the microphone 119.

The arrangement 103 may be implemented using a processor which may comprise several software and/or hardware modules. The arrangement 103 is adapted to carry out a method of controlling the permanent magnet generator 101 wherein the mechanical noise of the generator 101 is measured thereby generating the signal 121. Further, using the transformation module 123, two quantities are derived which are indicative of an amplitude and a phase of an undesired harmonic of the measured noise 121. In the illustrated embodiment, the module 123 represents a dq-transformation module which transforms the time course 121 of the sound pressure into a d-component and a q-component as represented by the vector output signal 125.

To perform the dq-transformation, the module 123 receives a delayed electrical phase 127 of an undesired harmonic, for example the 6f harmonic, indicating a signal having a frequency equal to 6 times a fundamental electrical frequency of the generator 101. In the present example, the 6f electrical phase is input as a signal 129 into a variable delay module 131 which delays the 6f electrical phase 129 by a delay time 133 which is received from a delay tuner 135.

Thereby, the delay tuner 135 is adapted to derive the delay time 133 based on an integrator value 137 as output from the PI controller 139. In particular, the delay tuner 135 derives the delay time 133 of a propagation of the noise over the distance l from the generator 101 to the microphone 119. Then, the electrical phase 129 of the undesired harmonic is delayed with the delay time 133 and is input as a signal 127 to the dq-transformation module 123. Thus, the dq-transformation module 123 performs a dq-transformation of the measured noise 121, wherein the dq-transformation is defined by a frequency (for example 6f) and the delayed electrical phase 127 of the undesired harmonic (for example 6f), to obtain a d-component and a q-component (vector signal 125) of the undesired harmonic of the noise.

The d-component and the q-component 125 of the undesired harmonic of the noise are then supplied as inputs to the PI controller 139 which outputs a d-component and a q-component of the signal 141 representing the current 115 to be injected and supplies the signal 141 to an inverse dq-transformation module 143. The inverse dq-transformation module 143 performs an inverse dq-transformation based on the frequency of the undesired harmonic and outputs a current signal 145 as a time course. The wind turbine controller 113 receives the signal 145 representing the current to be injected and generates the actual current 115 to be fed to stator coils of the generator 101.

For deriving the d-component and the q-component of the signal 141 representing the current to be injected, the PI controller 139 further receives a d-component and a q-component 147 of a current estimate associated with an actual (undelayed) working point of the generator 101. Herein, the working point is characterized by a delayed rotational speed signal 149 and a delayed power signal 151 as measured or determined in another manner. Thus, the rotational speed 153 of the generator 101 is for example measured and delayed using a variable delay element 131 to obtain the delayed rotational speed signal 149. Further, the electrical power 155 may be measured and may be delayed using another delay element 131 to obtain the delay power signal 151. To the delay elements 131, the delay time 133 is input.

The working point as defined by the delayed rotational speed 149 and the delayed power 151 is input in a feedforward memory block 157 which stores the current estimates 147 associated with a number of previously encountered working points 149, 151. Furthermore, the PI controller 139 also supplies the current signal 141 (defining the current to be injected into the generator 101) to the feedforward memory 157 which is thereby enabled to update the current estimates 147.

In FIG. 1, the thin lines represent scalar signals, whereas the thick lines represent vector signals, in particular comprising a d-component and a q-component of a dq-coordinate system rotating with the frequency corresponding to the undesired harmonic. Embodiments of the present invention also support to suppress more than one undesired harmonic by carrying out the explained method for every undesired harmonic and adding the resulting currents to be injected together.

Figure 2:
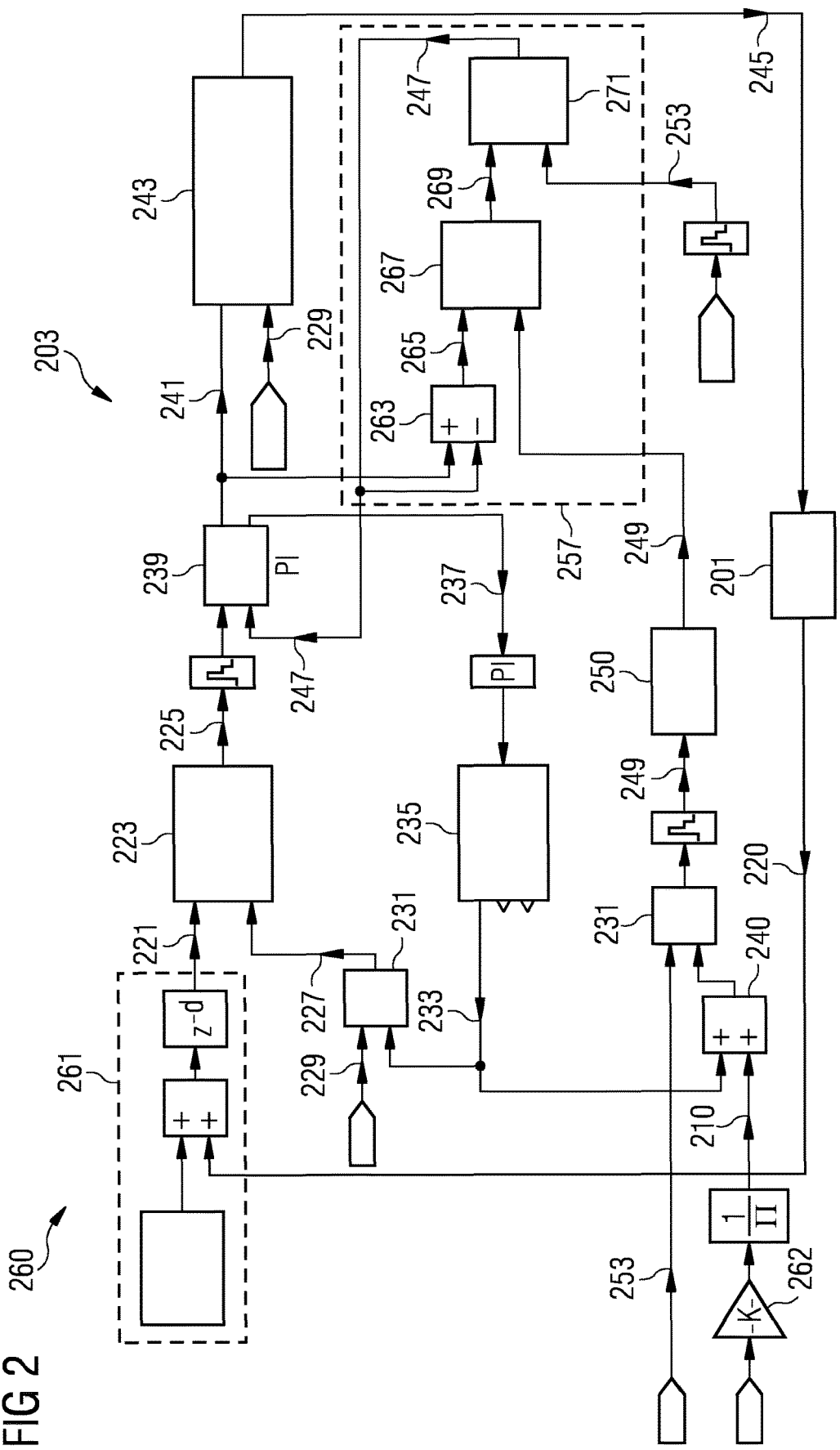

FIG. 2 schematically illustrates a simulation model also including an arrangement 203 for controlling a permanent magnet generator according to embodiments of the present invention. Thereby, elements being similar or identical in structure and/or function are labelled in FIGS. 1 and 2 with reference signs differing only in the first digit. The simulation model 260 thereby comprises an arrangement 203 for controlling the generator 201. The block 261 models the generation of the noise including the delay of the noise and outputs the noise signal 221. The noise signal 221 is input into the dq-transformation module 223 which outputs the d-component and the q-component 225 of the undesired harmonic of the noise and supplies it to the PI controller 239.

The PI controller 239 receives the current estimate 247 (also referred to as feedforward value) and outputs the current signal 241, in particular a d-component and a q-component of the current to be injected. The signal 241 is supplied to the inverse dq-transformation module 243 which eventually outputs the current signal 245 to be injected which is finally input to the generator 201.

The generator 201 produces the acoustic noise 220 which is detected by the not illustrated microphone and based upon which the microphone outputs the electrical noise signal 221. The delay tuner/module 235 receives the integrator output 237 from the PI controller 239. The delay module 235 outputs the delay time 233 (added, using addition element 240, to generator frequency 210 multiplied by gain) to the variable delay module 231 which receives the electrical phase 229 of the undesired harmonic and which outputs the delayed electrical phase 227 and provides it as input to the dq-transformation module 223.

In the example illustrated in FIG. 2, the working point is defined by the rotational speed 253 of the generator 201 which is delayed using the delay element 231, wherein the delayed rotational speed 249 is supplied to a working point selector 250 which selects the working point. The feedforward term may be a value selected from a lookup table. The working point selector 10 may select the right index or location in this table as a function of speed and/or power.

In FIG. 2, the feedforward memory module 257 is illustrated in more detail, as it may also be implemented in the arrangement illustrated in FIG. 1. The feedforward memory module 257 receives the delayed working point 249 and also receives the d-component and the q-component 241 of the signal (representing the current to be injected) from the PI controller 239. The feedforward memory module 257 comprises a difference element 263 which forms the difference between the d-component and q-component of the current to be injected 241 and the current estimate (also referred to as feedforward) 247 to obtain the difference current 265. The difference current 265 is input to the feedforward integration module 267 which receives the delayed rotational speed (or working point) 249 and outputs feedforward terms 269, in particular d-component and q-component thereof. The feedforward term 269 may (after the controller has settled) be the controller output (DQ) that will on average result in zero-error on the controller input. In other words the feedforward term may learn what the control output should be in the specific working points, and provide that value at the specific working points. It looks at the current controller output and compares it with the current feedforward term at the specific working points. If there is a difference, it adjusts it by small integration steps towards the controller output value.

The signal 269 is input to an interpolation module 271 which also receives the (undelayed) rotational speed 253 and outputs the current estimate 247. It should be noted that the stored values of the current estimates (stored in the feedforward integration module 267) are updated based on the delayed rotational speed 249, while the interpolation using the interpolation module 271 is performed based on the undelayed rotational speed signal 253. The interpolation is done on the undelayed working point, as the output of the interpolation is used directly at the generator, where there is no propagation delay. The update of the table is based on a noise error and a controller update, which is again based on the microphone signal, which is delayed. So the update has to be done on a delayed working point to match the propagation delay. In other words the information of adjustment to the feedforward table is delayed, so it should be the value related to the delayed working point that should be updated.

According to embodiments of the present invention, the torque ripple noise is measured with a microphone and both, the amplitude and the phase information of the measured noise is utilized to create a fast and stable control response. Therein, the controller (in particular the PI controllers 139, 239) may minimize the measured noise with a feedback loop. Thereby, the error signal 125, 225 contains both amplitude and phase, represented as a vector signal. In particular, the PI controllers 139, 239 may be implemented by providing two controllers each acting on a scalar input value. The microphone 119 may be placed in the base of the tower so that there may be a delay from the generator to the microphone (tower length divided by the speed of sound) which is estimated by the delay tuner 135, 235. The delay (in particular delay time 133, 233) is used to delay the reference for the dq-coordination transformation with the same delay as the delay from the generator to the microphone.

As the speed and the power at the wind turbine is varying, a feedforward memory 157, 257 is used to remember the last control action at the specific working points.

According to embodiments of the present invention, the arrangement uses a direct feedback control which means that it can find the right amplitude and phase automatically. Thereby, no turbine individual tuning may be necessary.

The controller may use two-dimensional dq-vectors (complex numbers). The advantage using complex numbers may be that the integrator and the PI controller starts to rotate the angle of its output, if the delay estimation is wrong. This behaviour of this rotation may be used by the delay tuner to find the right delay. The advance is then that the delay is automatically estimated.

The controller uses a feedforward memory, where it stores the output from the last control action at the specific working point and uses that as a starting value when the working point changes. The advantages of that is faster response in case of variations in the generator speed or power.

Figure 3:
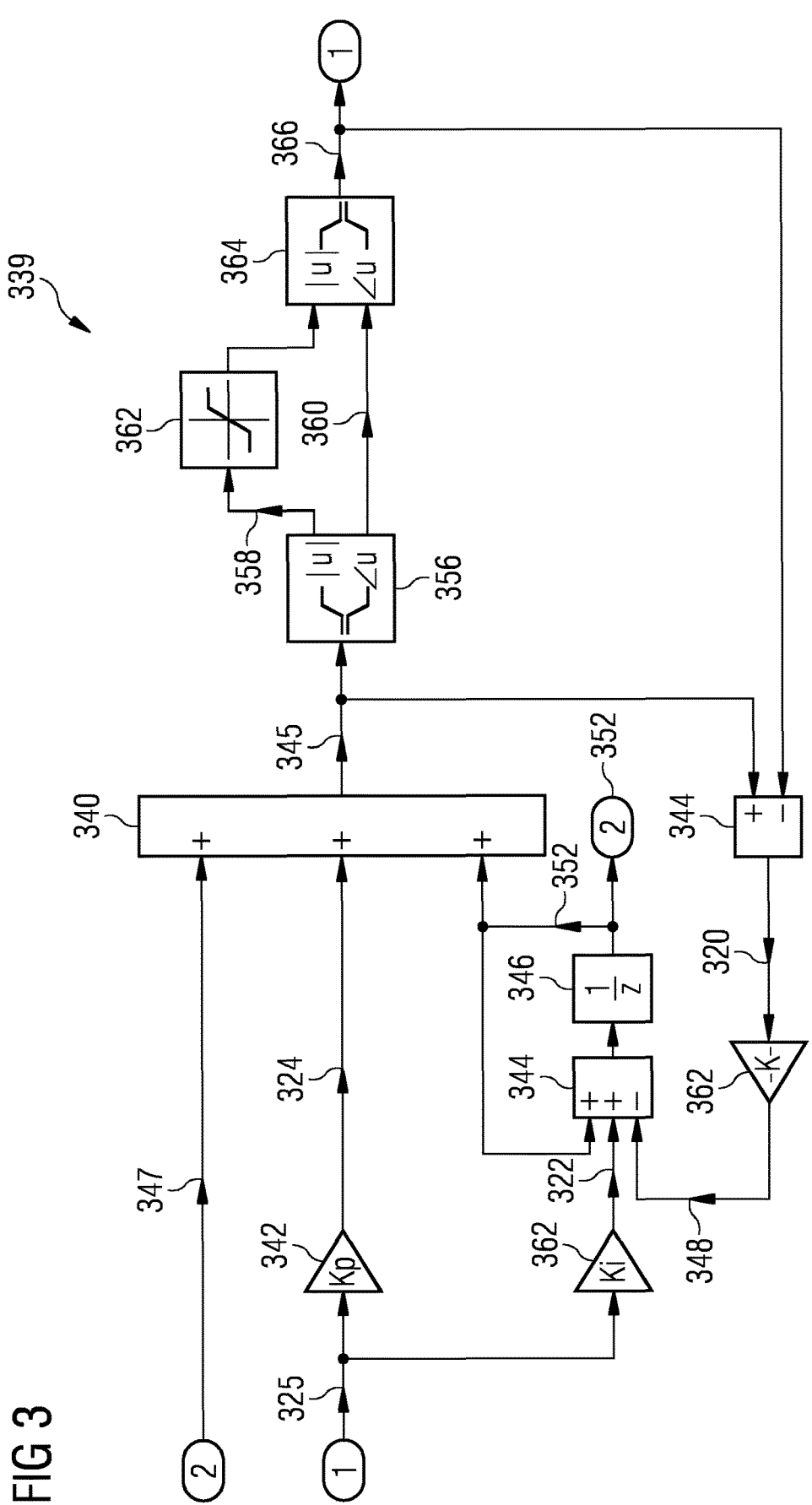

FIG. 3 schematically illustrates an embodiment of a PI controller 339 which may for example be used in the arrangement illustrated in FIG. 1 or 2. As inputs, the controller 339 illustrated in FIG. 3 receives the current estimate 347, in particular the d-component and the q-component of the current estimate. Further, the controller 339 receives the d-component and the q-component of the measured noise 325.

In a proportional branch, the d-component and the q-component 325 of the measured noise is multiplied by a gain Kp and supplied to an addition element 340 to which also the current estimate 347 is supplied. The gain element is labelled with reference sign 342.

In an integration branch, the d-component and q-component 325 of the measured noise is multiplied by an integrator gain Ki and supplied to an adding/difference element 344 to which also the output of an integrator module 346 is supplied as well as a reset windup feedback 348. The reset windup feedback 348 is subtracted from the sum of the output 352 of the integrator module 346 and the noise 325 multiplied by the integrator gain Ki using the gain module 362. The integrator output 352 is also provided as an output of the controller 339 which is used by the delay tuner as illustrated in FIGS. 1 and 2.

The output 354 of the addition element 340 is supplied to a conversion element 356 which converts the d-component and the q-component into an amplitude 358 and a phase 360. The amplitude is restricted in its magnitude by the saturation element 362 and the restricted amplitude is supplied to a reconversion element 364 to which also the phase 360 is supplied. The reconversion element outputs a restricted sum 366 as a d-component and a q-component of the current to be injected. The output of the summation element 340 is also referred to as a sum. The controller 339 is a standard PI controller with a feedforward term and saturation with reset windup feedback. The controller 339 works on complex numbers (dq-vectors).

Figure 4:
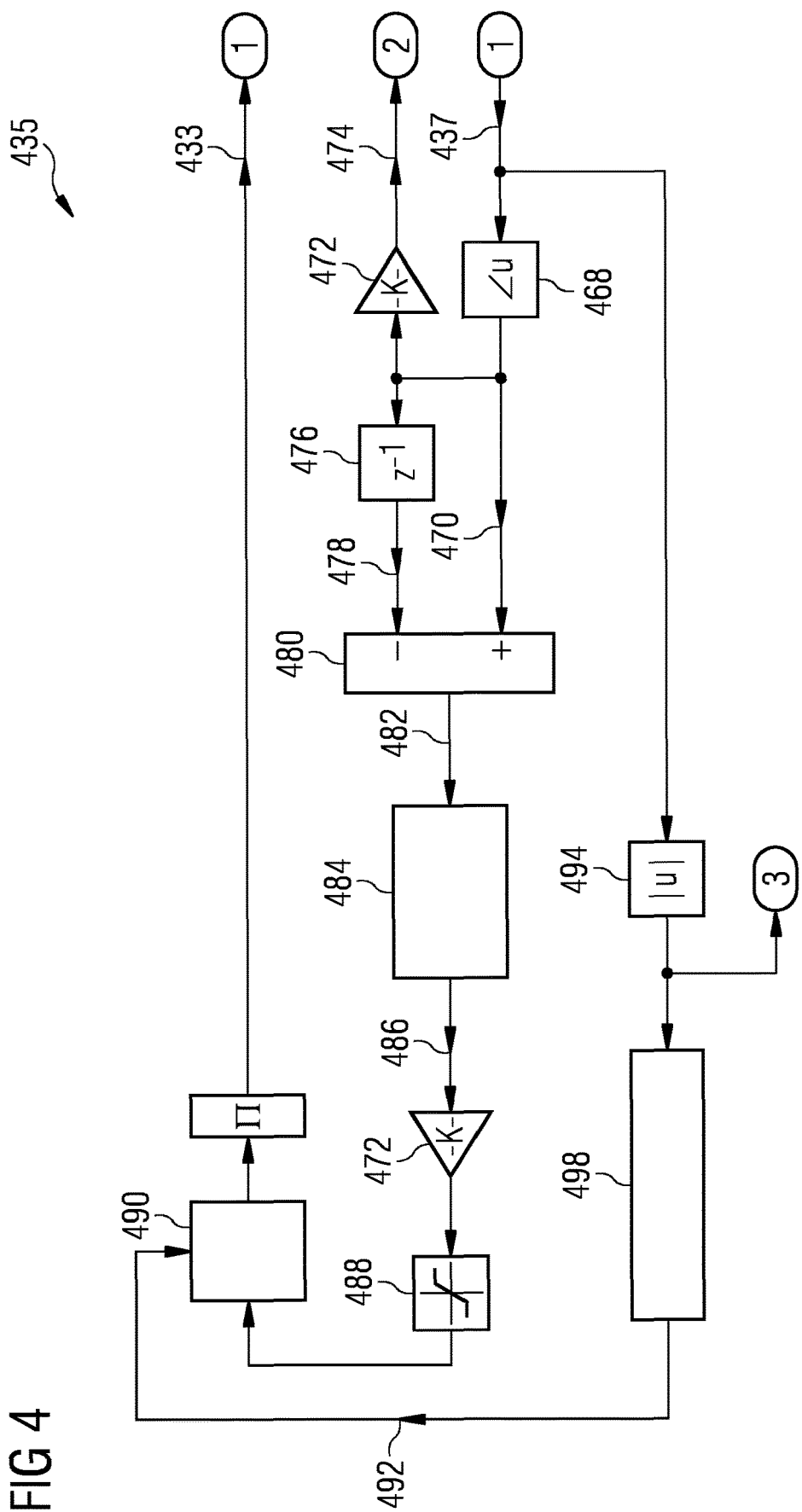

FIG. 4 schematically illustrates a delay tuner 435 which may be used in the arrangement as illustrated in FIG. 1 or 2. The delay tuner 435 receives as an input the time integral value (also referred to as integrator output of the PI controller) 437 from which the phase 470 is derived using the phase determination element 468. The phase 470 multiplied by a gain K using a gain element 272 is output as signal 474. The element 476 shifts the number of samples by one outputting a previous sample of the phase 470 as a signal 478. The phase 470 and the previous phase 478 are supplied to a difference element 480 which determines the difference which may also be considered as a derivative of the phase. The angle difference 482 is supplied to the modulus module 484 which determines the modulus of the difference signal 482 as output signal 486 which is multiplied by a gain K using a gain element 472 and is restricted in its magnitude during using the saturation element 488. The output of the saturation element 488 is supplied to an integrator 490 which integrates the received inputs if an amplitude 492 of the d-component and the q-component of the time integral value 437 is greater than a threshold as determined by the elements 498, 494. Thereby, the amplitude 492 is calculated from the time integral value 437 using the conversion module 494.

The input of the delay tuner 435 illustrated in FIG. 4 is the time integral value 437 as output from the PI controller illustrated in FIG. 1 or 2. Further, the delay tuner takes the angle of that complex integrator value and differentiates it to detect rotation. This signal is then multiplied with an integration factor and be integrated into the estimated delay. The delay estimation may then be used to delay the reference for the dq-transformation to avoid rotation of the integrator value of the PI controller, and ensure correct phase of the controller output.

FIG. 5A illustrates graphs of generator speed 501, the original noise together with the controller response 503, and the controller response together with the feedforward time 505. FIG. 5B illustrates graphs of the original noise together with the resulting noise 507, the estimated delay and the phase of the noise signal and the PI integrator value 511. In graph 503, the trace 513 denotes the original noise and the trace 515 denotes the controller response. In graph 505, the trace 515 again denotes the controller response and the trace 517 denotes the feedforward term, for example the signal 147 or 247 illustrated in FIG. 1 or 2. In graph 507, the trace 513 again denotes the original noise and the trace 519 denotes the noise as observed, when the control method according to embodiments of the present invention is carried out. Herein, a significant reduction can be seen around the time equal to 393 seconds.

In the graph 511, the trace 521 denotes the phase and the trace 523 denotes the PI integrator value.

Figure 6:
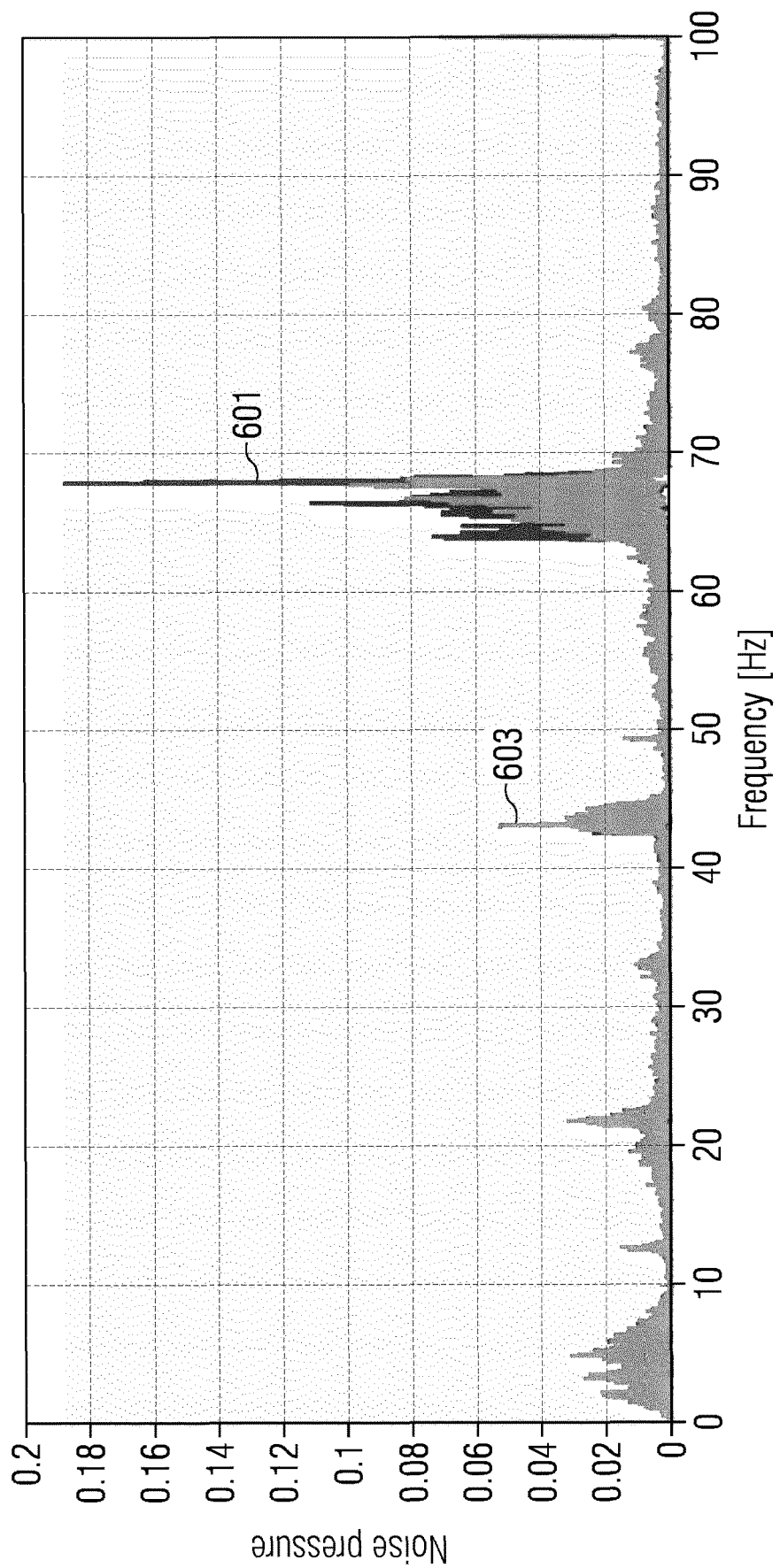
FIG. 6 illustrates a graph showing performance of arrangements according to embodiments of the present invention.

FIG. 6 shows the difference of the noise pressure in the frequency domain with and without the controller. Thereby, the trace 601 denotes the noise pressure without performing a method to embodiments of the present invention, while the trace 603 indicates the noise pressure when a control method according to embodiments of the present invention is carried out. The peak around 65 Hz is significantly reduced with the controller method as proposed in the present application.

FIG. 7A illustrates graphs of the speed 701, of the noise 703, and of the control signal and feedforward 705. FIG. 7B illustrates graphs of the original noise and the reduced noise 707, of the delay 709 and of the integrator value 711. Thereby, it can be appreciated how the controller adjusts the estimated delay after an initialization which is 8 ms of the right delay which is 300 ms. The first seconds, the controller goes in the saturation because the wrong delay estimation is used. The arrow 713 indicates a time region, in which the angle of the integrator value is rotating, while the arrow 715 points to a time region, where the angle is steady.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A method of controlling a permanent magnet generator, the method comprising:
   measuring mechanical noise of the generator, wherein the mechanical noise of the generator is measured using a microphone arranged a distance away from the generator;

deriving two quantities indicative of an amplitude and a phase of an undesired harmonic of the measured noise, wherein deriving the two quantities comprises:
  determining a delay time of a propagation of the noise over the distance from the generator to the microphone;
  delaying an electrical phase of the undesired harmonic with the delay time; and
  performing a dq-transformation of the measured noise, the dq-transformation being defined by a frequency and the delayed electrical phase of the undesired harmonic, to obtain a d-component and a q-component of the undesired harmonic of the noise as the two quantities; and
deriving, based on the two quantities, a current to be injected in stator coils of the generator such that the undesired harmonic is reduced, wherein deriving the current comprises:
  supplying the d-component and the q-component of the undesired harmonic of the noise as inputs to a PI controller;
  outputting a d-component and a q-component of the current to be injected from the controller;
  supplying, in a feed forward manner, a d-component and a q-component of a current estimate associated with an actual, undelayed, working point of the generator as further input to the controller;
  adding, for each the d-component and q-component, the current estimate, a term proportional to the undesired harmonic of the noise and a term proportional to a time integral value of the undesired harmonic of the noise, to obtain a sum; and
  outputting, for each the d-component and q-component, the current to be injected based on the sum.

2. The method according to claim 1, wherein the current to be injected is derived by:
  transforming the d-component and q-component of the sum into a polar representation including amplitude and phase) of the sum,
  restricting the magnitude of the amplitude, and
  back-transforming the restricted amplitude and the phase of the sum, to obtain a restricted sum as a d-component and a q-component of the current to be injected.

3. The method according to claim 2, further comprising, in particular as a Reset windup feedback:
  determining a difference between the sum and the restricted sum;
  multiplying the difference with a factor;
  deriving the time integral value taking into account the multiplied difference.

4. The method according to claim 1, wherein determining the delay time comprises:
  deriving a polar angle of the d-component and q-component of the time integral value;
  determining an angle difference between subsequent samples of the polar angle;
  integrating an angle difference based quantity, if an amplitude of the d-component and q-component of the time integral value is greater than a threshold, to obtain the delay time.

5. The method according to claim 1, further comprising:
  storing the d-component and the q-component of a current estimate associated with previous encountered working points in a storage;
  updating the d-component and the q-component of the current estimate associated with the delayed working point based on the controller output of the current to be injected, derived based on the delayed undesired harmonic of noise.

6. The method according to claim 1, further comprising:
  performing an undelayed reverse dq-transformation of the d-component and a q-component of the current to be injected; and
  injecting the reverse transformed current in at least one stator coil of the generator.

7. An arrangement for controlling a permanent magnet generator, the arrangement comprising:
  a microphone adapted to measure mechanical noise of the generator;
  a processor configured to:
    derive two quantities indicative of an amplitude and a phase of an undesired harmonic of the measured noise,
      by determining a delay time of a propagation of the noise over the distance from the generator to the microphone;
      delaying an electrical phase of the undesired harmonic with the delay time;
      performing a dq-transformation of the measured noise, the dq-transformation being defined by a frequency and the delayed electrical phase of the undesired harmonic, to obtain a d-component and a q-component of the undesired harmonic of the noise as the two quantities; and
    derive, based on the two quantities, a current to be injected in stator coils of the generator such as to reduce the undesired harmonic, by:
      supplying the d-component and the q-component of the undesired harmonic of the noise as inputs to a PI controller;
      outputting a d-component and a q-component of the current to be injected from the controller;
      supplying, in a feed forward manner, a d-component and a q-component of a current estimate associated with an actual, undelayed, working point of the generator as further input to the controller;
      adding, for each the d-component and q-component, the current estimate, a term proportional to the undesired harmonic of the noise and a term proportional to a time integral value of the undesired harmonic of the noise, to obtain a sum; and
      outputting, for each the d-component and q-component, the current to be injected based on the sum.

8. A generator, comprising the arrangement according to claim 7.

9. A wind turbine, comprising the generator according to claim 8.

10. The arrangement according to claim 7, further comprising:
  performing an undelayed reverse dq-transformation of the d-component and a q-component of the current to be injected; and
  injecting the reverse transformed current in at least one stator coil of the generator.

11. A method of controlling a permanent magnet generator, the method comprising:
  measuring mechanical noise of the generator, wherein the mechanical noise of the generator is measured using a microphone arranged a distance away from the generator;
  deriving two quantities indicative of an amplitude and a phase of an undesired harmonic of the measured noise, wherein deriving the two quantities comprises:

determining a delay time of a propagation of the noise over the distance from the generator to the microphone;

delaying an electrical phase of the undesired harmonic with the delay time; and performing a dq-transformation of the measured noise, the dq-transformation being defined by a frequency and the delayed electrical phase of the undesired harmonic, to obtain a d-component and a q-component of the undesired harmonic of the noise as the two quantities;

deriving, based on the two quantities, a current to be injected in stator coils of the generator such that the undesired harmonic is reduced, wherein deriving the current comprises:

supplying the d-component and the q-component of the undesired harmonic of the noise as inputs to a PI controller;

outputting a d-component and a q-component of the current to be injected from the controller;

performing an undelayed reverse dq-transformation of the d-component and a q-component of the current to be injected; and injecting the reverse transformed current in at least one stator coil of the generator.

\* \* \* \* \*